(12) United States Patent
Madisetti et al.

(10) Patent No.: US 12,542,804 B2
(45) Date of Patent: Feb. 3, 2026

(54) METHOD AND SYSTEM FOR REQUEST IDENTIFICATION FOR SECURITY AND FAIRNESS IN SERVERLESS FUNCTIONS

(71) Applicant: Vijay Madisetti, Alpharetta, GA (US)

(72) Inventors: Vijay Madisetti, Alpharetta, GA (US); Arshdeep Bahga, Chandigarh (IN)

(73) Assignee: Vijay Madisetti, Alpharetta, GA (US)

( * ) Notice: Subject to any disclaimer, the term of this patent is extended or adjusted under 35 U.S.C. 154(b) by 0 days.

(21) Appl. No.: 19/169,644

(22) Filed: Apr. 3, 2025

(65) Prior Publication Data
US 2025/0317468 A1    Oct. 9, 2025

Related U.S. Application Data

(60) Provisional application No. 63/575,316, filed on Apr. 5, 2024.

(51) Int. Cl.
*H04L 9/40* (2022.01)
*H04L 47/80* (2022.01)

(52) U.S. Cl.
CPC ........ *H04L 63/1433* (2013.01); *H04L 47/805* (2013.01); *H04L 63/1458* (2013.01); *H04L 63/20* (2013.01)

(58) Field of Classification Search
CPC .............. H04L 63/1433; H04L 47/805; H04L 63/1458; H04L 63/20
See application file for complete search history.

(56) References Cited

U.S. PATENT DOCUMENTS

| | | | |
|---|---|---|---|
| 9,251,199 B2* | 2/2016 | Schiebeler | G06F 16/24552 |
| 2013/0151784 A1* | 6/2013 | Bell, Jr. | G06F 12/0815 |
| | | | 711/E12.07 |
| 2013/0254845 A1* | 9/2013 | Boesgaard Soerensen | |
| | | | G06F 21/606 |
| | | | 726/3 |
| 2024/0163261 A1* | 5/2024 | Crabtree | H04L 63/0815 |
| 2025/0280027 A1* | 9/2025 | Mignot | H04L 63/1433 |

FOREIGN PATENT DOCUMENTS

CN            103957195 A  *  7/2014

* cited by examiner

*Primary Examiner* — Sm A Rahman
(74) *Attorney, Agent, or Firm* — Daniel C. Pierron; Widerman Malek, PL

(57) ABSTRACT

The present invention is directed to systems and methods for request identification in serverless functions including checking incoming requests against cached requests, validating, contextualizing, and generating UUIDs for incoming requests, applying policies to incoming requests, making execution decisions and scheduling incoming requests for execution.

30 Claims, 11 Drawing Sheets

METHOD AND SYSTEM FOR REQUEST IDENTIFICATION FOR SECURITY AND FAIRNESS IN SERVERLESS FUNCTIONS

RELATED APPLICATIONS

This application claims priority under 35 U.S.C. § 119(e) of U.S. Provisional Patent Application Ser. No. 63/575,316 filed on Apr. 5, 2024 and titled Generation of a Request ID for a Lambda Service for Security and Fairness. The content of this application is incorporated herein by reference.

FIELD OF THE INVENTION

The present invention relates generally to computer security systems and resource management in distributed computing environments. More particularly, the invention concerns systems and methods for request identification, validation, admission control, and resource allocation in serverless computing architectures through the implementation of context-aware request identifiers.

BACKGROUND

Serverless computing has emerged as a prominent paradigm in cloud computing, offering developers the ability to build and deploy applications without managing the underlying infrastructure. This architecture, commonly implemented as Functions-as-a-Service (FaaS), automatically provisions and scales resources in response to demand, providing cost efficiency through granular, consumption-based pricing models.

While serverless architectures offer numerous advantages, they introduce unique security challenges and resource management considerations that are inadequately addressed by conventional solutions. As organizations increasingly migrate mission-critical applications to serverless platforms, these environments have become attractive targets for malicious actors seeking to disrupt operations, exploit vulnerabilities, or generate excessive costs through fraudulent requests.

Serverless computing platforms face several security challenges that differ from traditional infrastructure models. For example, Distributed Denial of Service (DDoS) attacks represent a significant threat, wherein adversaries overwhelm systems by generating excessive function invocations, resulting in service degradation, resource exhaustion, and increased operational costs.

Current cloud providers offer several security mechanisms for serverless environments. These typically include DDOS protection services at network boundaries, web application firewalls implementing rule-based filtering, API gateway throttling to limit request rates, concurrency limits controlling function execution, and identity and access management frameworks. Conventional DDOS protection mechanisms primarily focus on network and transport layer defenses, typically implemented at infrastructure boundaries. These solutions include traffic filtering based on protocol characteristics, rate limiting based on source IP addresses, and pattern-based signature detection. However, these approaches are insufficient against application-layer attacks that mimic legitimate traffic patterns while targeting serverless function endpoints.

Furthermore, existing security mechanisms commonly employ binary decision models that either allow or block requests based on predefined rules, lacking the capability to implement graduated responses proportional to the assessed threat level. This limitation results in either excessive false positives that impede legitimate business operations or false negatives that permit malicious traffic to reach backend systems.

Current cloud providers offer several resource management features for serverless environments. These typically include reserved concurrency guarantees, provisioned capacity to reduce cold start latency, auto-scaling capabilities, and basic monitoring services. Existing implementations typically offer basic concurrency controls, such as maximum execution limits and simple queuing mechanisms. These controls, however, operate based on technical metrics rather than business value, treating all requests of the same type uniformly regardless of their importance to organizational objectives.

During periods of high demand or resource contention, critical operations may compete with lower-priority functions for available resources, resulting in degraded performance for high-value transactions. Current serverless platforms lack advanced mechanisms to dynamically prioritize requests based on business context, customer tier, transaction value, or other business-relevant attributes.

Moreover, existing resource allocation mechanisms in serverless platforms are mostly static in nature, requiring manual configuration and reconfiguration as business conditions evolve. This static approach cannot adapt to changing priorities in real-time, limiting the platform's ability to optimize resource utilization in accordance with dynamic business requirements.

A limitation of current implementations is their limited context awareness. Existing security measures primarily focus on identity verification and rule-based filtering without evaluating the full context of requests, including user behavior patterns, temporal factors, and business significance. This narrow focus results in security decisions based on insufficient information, reducing effectiveness against sophisticated attacks.

From a resource management perspective, existing platforms provide basic prioritization capabilities that inadequately reflect business priorities. Resources are allocated based primarily on technical metrics such as arrival time or basic service tiers, without consideration for transaction value, customer importance, or operational criticality. This misalignment between technical resource allocation and business priorities results in suboptimal performance for high-value operations during resource contention scenarios.

Furthermore, current implementations offer limited options for handling requests during capacity constraints. Typical responses include simple queuing based on arrival time or outright rejection when limits are reached, without sophisticated mechanisms to make fine-grained admission decisions based on business context.

While the security and resource management features offered by cloud providers in their serverless platforms provide foundational protection and control, they exhibit significant limitations in addressing sophisticated security threats and complex resource allocation requirements. No comprehensive system currently exists that integrates advanced security protection with business-aligned resource management in serverless computing environments. There remains a need for a system that can make context-aware admission decisions while optimizing resource allocation in accordance with organizational priorities.

This background information is provided to reveal information believed by the applicant to be of possible relevance to the present invention. No admission is necessarily intended, nor should be construed that any of the preceding information constitutes prior art against the present invention.

SUMMARY OF THE INVENTION

With the above in mind, embodiments of the present invention are directed to a system and associated methods for request identification for security and fairness in serverless functions.

The present invention addresses the technical limitations of existing approaches through a novel system architecture designated as the "RequestID System" that implements context-aware admission control and resource allocation through a multi-layered architecture. This invention provides a technical solution for request identification, validation, admission control, and resource allocation in serverless computing architectures through the implementation of context-aware request identifiers.

In one embodiment, the present invention comprises a system for request identification and resource management in serverless computing environments, comprising a multi-layered architecture with a client layer, an edge layer, a core RequestID system, and a backend services layer, wherein the system implements context-aware admission control and prioritized resource allocation based on business value metrics.

In another embodiment, the present invention comprises a UUID Generator that creates tamper-evident request identifiers by combining multiple authentication factors including user credentials, session information, temporal factors, spatial factors, and behavioral patterns, and applying cryptographic hashing to secure these identifiers against manipulation.

Another embodiment of the invention involves a method for request validation that employs graduated depth analysis, including authentication checks, historical pattern comparison, behavioral analysis, and anomaly detection using machine learning models to calculate a comprehensive risk score for each incoming request.

Another embodiment of the invention introduces a Decision Maker component that implements a multi-path decision model, enabling fine-grained responses to requests including immediate execution, constrained resource allocation, deferred execution, or rejection, based on policy evaluation and risk assessment.

Another embodiment of the invention provides a mechanism for business-aligned resource allocation through a Resource Scheduler that prioritizes requests according to customer tier, transaction value, operational criticality, and temporal factors, ensuring optimal resource utilization during periods of contention.

Another embodiment provides a Policy Engine that applies multiple policy types simultaneously, including security policies, rate limiting policies, business priority policies, resource allocation policies, cost control policies, and compliance policies, producing consolidated policy results that guide admission decisions.

Another embodiment of the invention comprises a service level agreement (SLA) Enforcer that maintains service level agreements by calculating execution deadlines, evaluating completion probability, and dynamically escalating priorities for at-risk operations to ensure contractual obligations are met.

Another embodiment includes a Utility Optimizer that maximizes business value from computing resources by fine-tuning execution parameters, implementing batch processing for similar requests, configuring appropriate timeouts, establishing retry policies, and providing execution environment hints for optimal performance.

Another embodiment provides a monitoring and feedback system that continuously evaluates queue status, implements resource rebalancing when thresholds are exceeded, and reassesses priorities based on changing system conditions to maintain optimal performance.

Another embodiment of the invention introduces an Analytics Engine with machine learning capabilities for anomaly detection, pattern recognition, and business impact analysis to identify sophisticated attack patterns and optimize admission control decisions based on operational intelligence.

DETAILED DESCRIPTION OF THE INVENTION

The present invention will now be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled people having the benefit of this disclosure. Like numbers refer to like elements throughout.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly modified.

Figure 1:
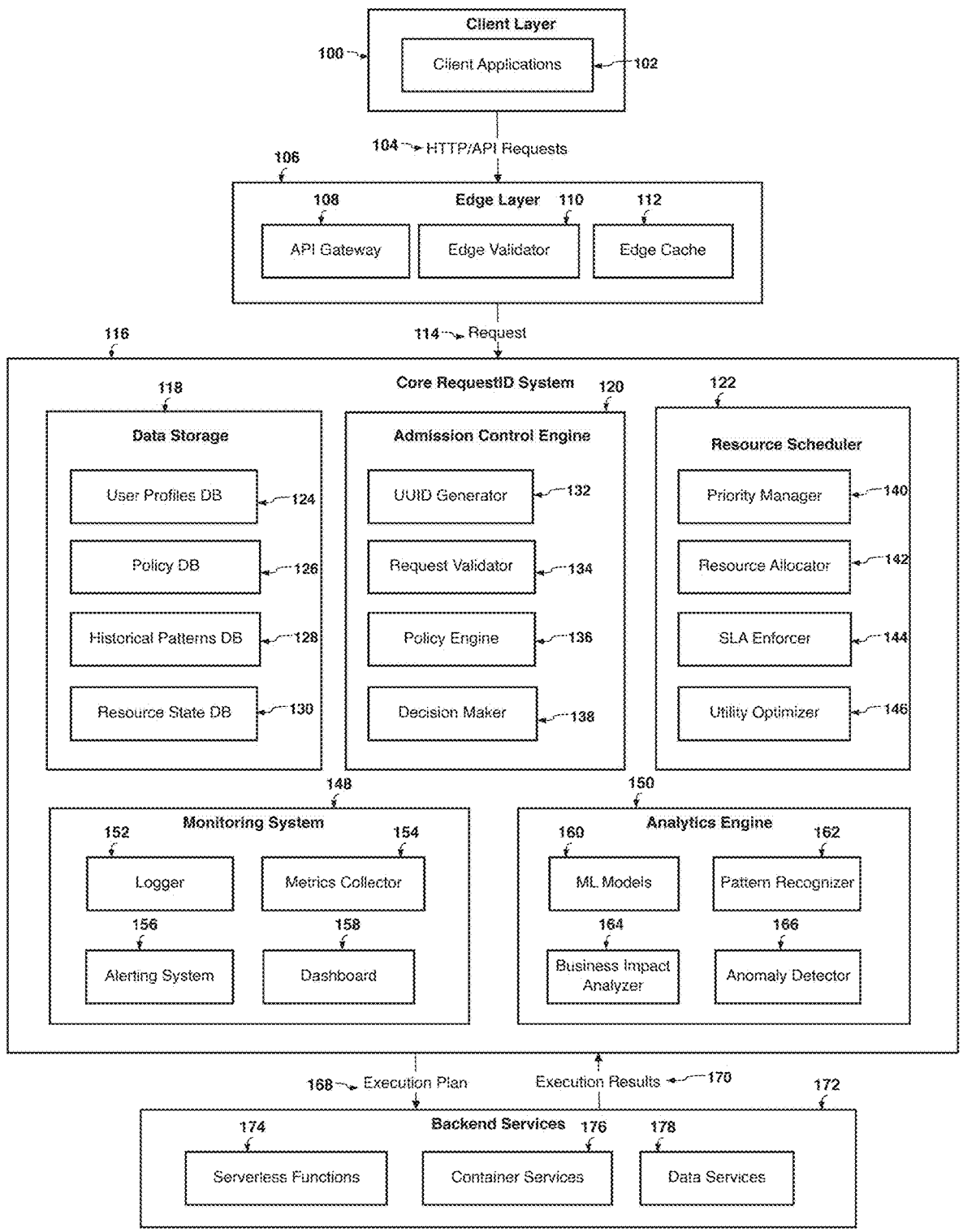
FIG. 1 is an illustration of the overall architecture diagram of the RequestID System, according to an embodiment of the present invention.

Referring now to FIG. 1, an illustration of the overall architecture diagram of the RequestID System, is described in more detail. The RequestID System architecture comprises a multi-layered approach to process, validate, and manage requests to backend computing resources. The architecture includes four layers, each containing specialized components that work together to provide the request validation and resource management functionality.

The topmost layer is a Client Layer 100, which is the origination point for requests. This layer 100 comprises Client Applications 102 that generate HTTP/API Requests 104 directed toward the system. These Client Applications 102 may include web applications, mobile clients, third-party integrations, or any other software entity seeking to access protected resources.

The second layer is the Edge Layer 106, which serves as the initial defensive barrier and comprises three principal components. An API Gateway 108 functions as the entry point for all incoming requests, receiving transmissions from the Client Layer. An Edge Validator 110 performs preliminary request screening and validation operations. An Edge Cache 112 stores validation results to optimize performance for repeated or similar requests.

The third layer is the Core RequestID System 116, which constitutes the central processing framework of the architecture. This layer is further subdivided into five functional subsystems (118, 120, 122, 148, 150). The first subsystem is the Admission Control Engine 120 which includes the UUID Generator 132 for creating unique request identifiers, the Request Validator 134 for performing deep request analysis, the Policy Engine 136 for applying organizational policies, and the Decision Maker 138 for determining request processing. The various subsystems recited herein, both above and below, may be implemented as software modules.

The second subsystem within the Core RequestID System is the Resource Scheduler 122, comprising the Priority Manager 140 for assigning execution priorities, the Resource Allocator 142 for distributing computing resources, the SLA Enforcer 144 for maintaining service level agreements, and the Utility Optimizer 146 for maximizing business value through efficient allocation of resources.

The third subsystem within the Core RequestID System is the Data Storage subsystem 118 containing databases for User Profiles 124, Policies 126, Historical Patterns 128, and Resource State information 130.

The fourth subsystem is the Analytics Engine subsystem 150, which comprises Machine Learning (ML) Models 160, an Anomaly Detector 166, a Pattern Recognizer 162, and a Business Impact Analyzer 164 for advanced data analysis and threat detection.

The fifth subsystem within the Core RequestID System is the Monitoring System 148, comprising a Logger 152, Metrics Collector 154, Alerting System 156, and Dashboard 158 for comprehensive system visibility.

At the bottommost level is the Backend Services layer 172, which represents the protected computing resources. This layer includes Serverless Functions 174, Container Services 176, and Data Services 178 that process legitimate requests after validation and resource allocation.

The RequestID System architecture facilitates bidirectional information flow, with requests traversing downward through the layers and execution results propagating upward. The Client Layer 100 transmits HTTP/API Requests 104 to the Edge Layer 106, which forwards filtered requests 114 to the Core RequestID System. The Core RequestID System performs comprehensive validation and, for approved requests, sends an Execution Plan 168 to the Backend Services 172. Upon completion, the Backend Services 172 return Execution Results 170 through the system. This multi-layer architecture enables the RequestID System to provide context-aware request validation, resource allocation, and security protection while maintaining high performance and scalability.

Figure 2:
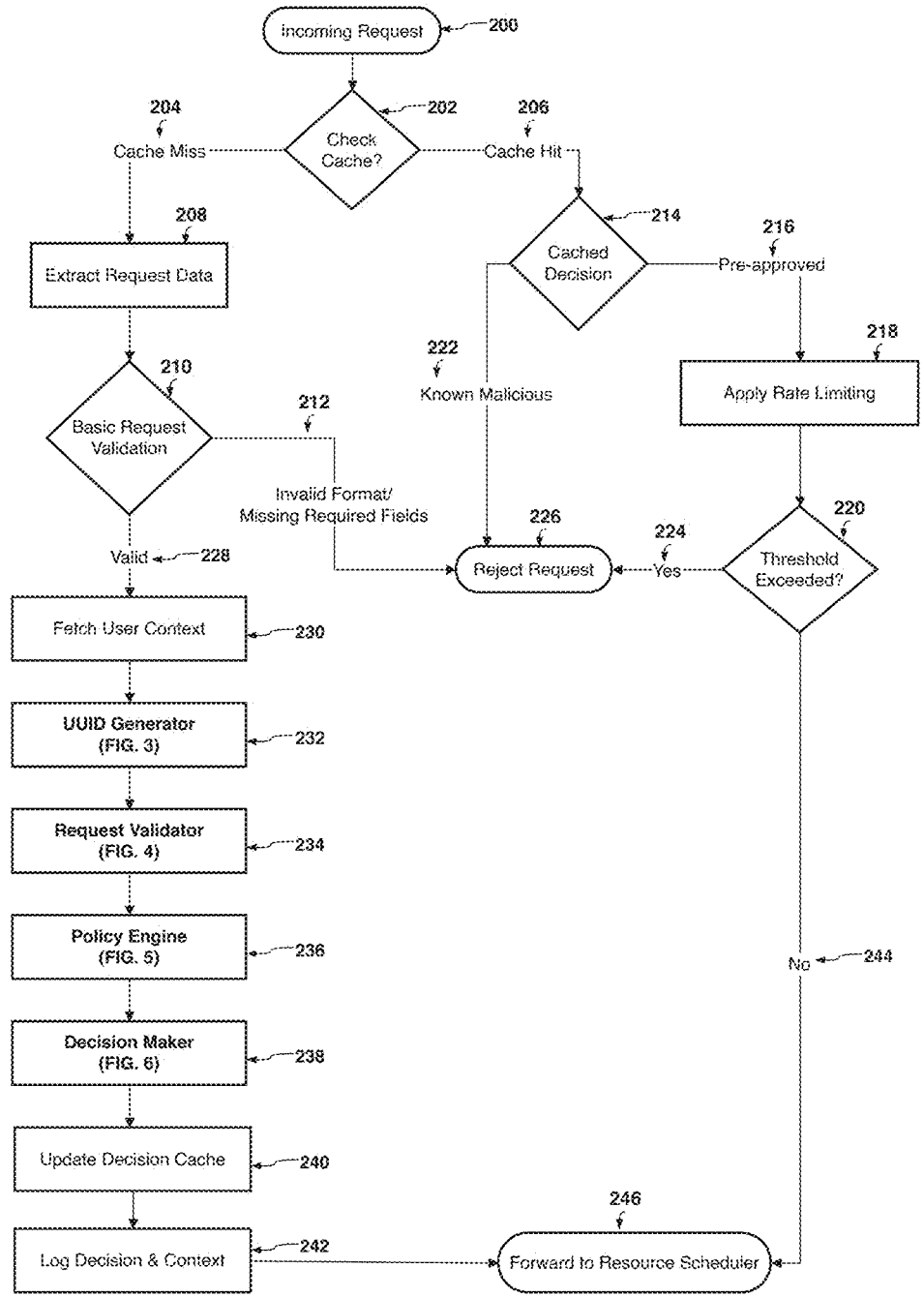
FIG. 2 is a flow diagram illustrating a method of operation of the Admission Control Engine within the RequestID System, according to an embodiment of the present invention.

Referring now to FIG. 2, a flow diagram illustrating a method of operation of the Admission Control Engine within the RequestID System, is described in more detail. The Admission Control Engine operation begins with an Incoming Request 200 entering the system. Upon receipt, the system checks if the request is present in the cache at step 202. If the request results in a Cache Hit 206, the flow proceeds to evaluate the Cached Decision 214 for the request. The Cached Decision evaluation 214 branches into two paths. If the request is identified as Pre-approved 216, it proceeds to the Apply Rate Limiting function 218. If the request is identified as Known Malicious 222, it is directed immediately rejected at step 226. For Pre-approved requests 216, the system applies rate limiting function 218 and subsequently evaluates whether a Threshold Exceeded condition 220 exists. If rate limits are exceeded 224, the request is rejected at step 226; otherwise 244, the request is forwarded to Resource Scheduler at step 246.

If the initial cache check at step 202 results in a Cache Miss 204, the flow proceeds through a different branch beginning with extracting Request Data at step 208, wherein the system extracts pertinent information from the request. Following data extraction, the system performs Basic Request Validation at step 210 to verify the request format and required fields.

If the Basic Request Validation step 210 determines the request contains invalid format or missing required fields 212, the request is rejected at step 226. Whereas, if the validation determines the request is valid 228, the system proceeds to Fetch User Context at step 230, retrieving contextual information associated with the requesting entity.

With the user context established, the flow sequentially proceeds through the primary functional components of the Admission Control Engine. First, the request enters the UUID Generator at step 232, which creates a unique identifier incorporating multiple contextual factors. Subsequently, the request, now augmented with its UUID, enters the Request Validator at step 234 which performs deep behavioral and pattern analysis. The validated request then proceeds to the Policy Engine at step 236 for the application of organizational security and resource policies. Finally, the request enters the Decision Maker at step 238, which determines whether to accept, constrain, defer, or reject the request.

Following the Decision Maker's determination, the system performs an Update Decision Cache operation at step 240 to store the decision for potential future requests of similar nature. The flow concludes with Log Decision & Context at step 242, creating an audit record of the request and its disposition, before forwarding the accepted request to the Resource Scheduler at step 246. The request processing flow illustrated herein enables the Admission Control Engine to make context-aware admission decisions while maintaining efficiency through caching and graduated validations.

Figure 3:
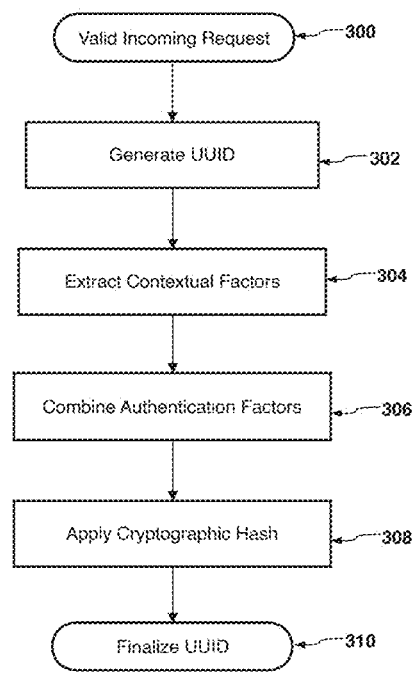
FIG. 3 is a flow diagram illustrating a method of operation of the UUID Generator component of the Admission Control Engine within the RequestID System, according to an embodiment of the present invention.

Referring now to FIG. 3, a flow diagram illustrating a method of operation of the UUID Generator component of the Admission Control Engine within the RequestID System, is described in more detail. The UUID Generator implements a process for creating unique, context-aware request identifiers that begins with a Valid Incoming Request entering the component at step 300.

At the next step 302, the Generate UUID operation is performed, which initiates the creation of a unique identifier for the request.

At the next step 304, the system extracts Contextual Factors, wherein the system identifies and isolates multiple contextual elements from the incoming request. These contextual elements include user identity information, request timestamp, target resource information, client details such as IP address and geographic location, request type, anticipated resource consumption, and other business context information relevant to the request.

At the next step 306, the system combines authentication factors, where the system integrates multiple authentication-related elements to strengthen the request's identity validation. This integration combines user credentials, session information, temporal factors relative to the user's established patterns, spatial factors related to geographic origin and network characteristics, and behavioral factors reflecting typical usage patterns. The combination of these diverse factors creates a robust foundation that significantly impedes potential attackers from fabricating valid identifiers without possessing the appropriate credentials and contextual elements.

At the next step 308, the system applies cryptographic hash, wherein the system applies a secure cryptographic algorithm to the combined factors using the system's secret key. This cryptographic operation generates a tamper-evident signature of the request context, ensuring that even minor modifications to the input would produce entirely and/or recognizably different output values. The cryptographic properties of this operation serve as a fundamental security mechanism within the overall validation architecture.

At the next step 310, the system finalizes UUID operation, wherein the generated identifier is structured according to the system's standardized UUID format. This finalization may include organizing visible components for traceability and debugging while ensuring cryptographic components remain secured. The completed UUID now serves as a tamper-evident token representing the request's legitimacy and containing embedded contextual information for subsequent validation steps. The UUID generation process illustrated herein enables the creation of cryptographically secure, context-rich identifiers that serve as the foundation for the system's advanced request validation capabilities.

Figure 4:
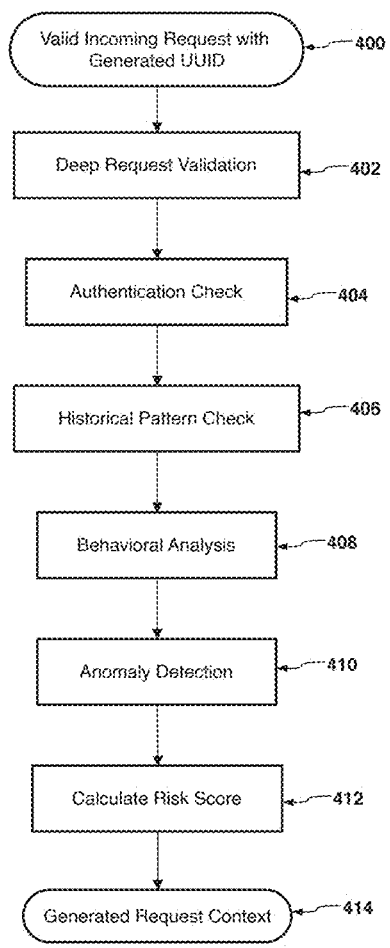
FIG. 4 is a flow diagram illustrating a method of operation of the Request Validator component of the Admission Control Engine within the RequestID System, according to an embodiment of the present invention.

Referring now to FIG. 4, a flow diagram illustrating a method of operation of the Request Validator component of the Admission Control Engine within the RequestID System, is described in more detail. The Request Validator implements a comprehensive validation process that begins with a Valid Incoming Request with Generated UUID entering the component at step 400. This input represents a request that has passed initial validation checks and has been assigned a unique identifier through the UUID Generator component.

At the next step 402, deep request validation operation is performed, wherein the system performs in-depth examination of the request against multiple validation criteria.

At the next step 404, the system proceeds to an Authentication Check, wherein the system verifies that the requester has been properly authenticated. This verification includes validating authentication tokens or credentials, checking for token expiration or revocation, verifying that the authentication level is sufficient for the requested resource, and confirming that the identity matches the one used in UUID generation.

At the next step 406, the system advances to a Historical Pattern Check, where the system compares the current request against established patterns of behavior. This comparison examines whether the user typically accesses the requested resource, evaluates if the request timing aligns with previously identified and/or recognized nominal patterns, assesses whether the request volume is consistent with historical usage, and flags deviations from established patterns for further scrutiny.

At the next step 408, the system performs a Behavioral Analysis, wherein the system applies AI and/or Machine Learning models to analyze the request in the context of the user's session. This analysis evaluates whether the request behavior is consistent with the user's profile, checks for interaction patterns typical of legitimate use, and identifies patterns commonly observed in attack scenarios.

At the next step 410, the system performs an Anomaly Detection operation, where AI and Machine Learning models identify potential anomalies in the request pattern. These models flag statistical outliers, compare against known attack signatures, identify coordinated patterns across multiple users, and detect subtle deviations that might indicate sophisticated attacks.

At the next step 412, the system calculates a Risk Score, wherein the system computes a comprehensive risk assessment based on all preceding validation steps. This calculation incorporates weighted factors including authentication strength, detected anomalies and deviations, and historical trust metrics. The final risk score represents the system's confidence in the request's legitimacy and serves as a significant and/or crucial input to subsequent decision-making processes.

Upon the conclusion of the Request Validation process the system produces a Generated Request Context 414 that encapsulates all validation results, risk assessments, and contextual information for use by subsequent components in the RequestID System. This validation process enables detection of potentially malicious or anomalous requests while facilitating appropriate handling of legitimate traffic.

Figure 5:
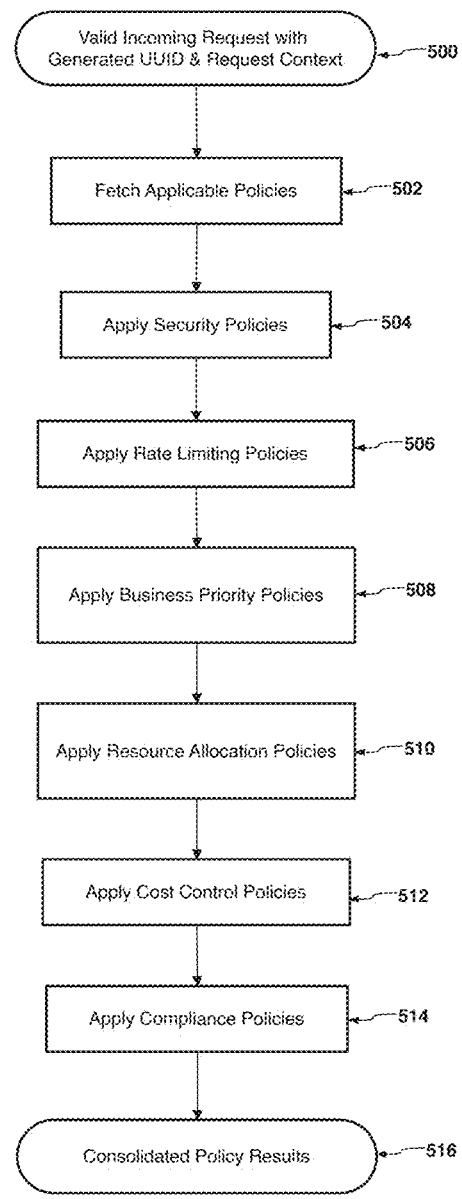
FIG. 5 is a flow diagram illustrating a method of operation of the Policy Engine component of the Admission Control Engine within the RequestID System, according to an embodiment of the present invention.

Referring now to FIG. 5, a flow diagram illustrating a method of operation of the Policy Engine component of the Admission Control Engine within the RequestID System, is described in more detail. The Policy Engine implements a structured policy application process that begins with a Valid Incoming Request with Generated UUID & Request Context entering the component at step 500. This input represents a request that has passed initial validation checks, has been assigned a unique identifier, and has undergone deep validation through the Request Validator component.

At the next step 502, the system fetches Applicable Policies relevant to the particular request. This retrieval identifies security policies based on resource sensitivity, rate limiting policies for the user and resource, business policies reflecting organizational priorities, resource allocation policies based on current system state, and other applicable governance rules. These policies may vary according to time of day, system load, or business conditions.

At the next step 504, the system applies Security Policies, wherein the system evaluates the request against security-related rules. This evaluation verifies whether the resource requires special permissions, confirms access controls and authorization, applies data protection and privacy policies, and enforces multi-factor authentication requirements when necessary.

At the next step 506, the system applies Rate Limiting Policies, where the system implements controls on request frequency. This application enforces per-user rate limits, applies per-resource rate limits, considers global rate limiting during high-load periods, and implements progressive rate limiting based on user behavior patterns.

At the next step 508, the system applies Business Priority Policies, wherein the system evaluates business value factors. This evaluation considers customer tier and importance, transaction value and revenue impact, identifies important business operations, and implements special handling for mission-significant, alternatively mission-critical, processes to ensure alignment with organizational priorities.

At the next step 510, the system applies Resource Allocation Policies, wherein the system addresses resource constraint considerations. At this step the system checks the current load on target resources, considers capacity planning guidelines, implements fair share allocation between users, and reserves capacity for high-priority operations.

At the next step 512, the system applies Cost Control Policies, wherein the system incorporates financial considerations. This application ensures requests remain within budget allocations, implements cost-sharing across business units, prevents unexpected cost spikes from automated systems, and balances cost control with performance requirements.

At the next step 514, the system applies Compliance Policies, where the system enforces regulatory and governance requirements. This enforcement ensures requests comply with relevant regulations, applies industry-specific compliance requirements, enforces data sovereignty and regional restrictions, and implements audit logging and controls.

The Policy Engine process concludes at step 516 with the production of Consolidated Policy Results that combine the outcomes from all policy evaluations. This consolidation resolves conflicts between different policy types, determines the overall policy disposition, identifies specific constraints or conditions to apply, and creates a unified policy determination for use by subsequent components in the RequestID System. The Policy Engine process illustrated herein enables the RequestID System to make fine-grained admission decisions that balance security, resource efficiency, business priorities, and compliance requirements.

Figure 6:
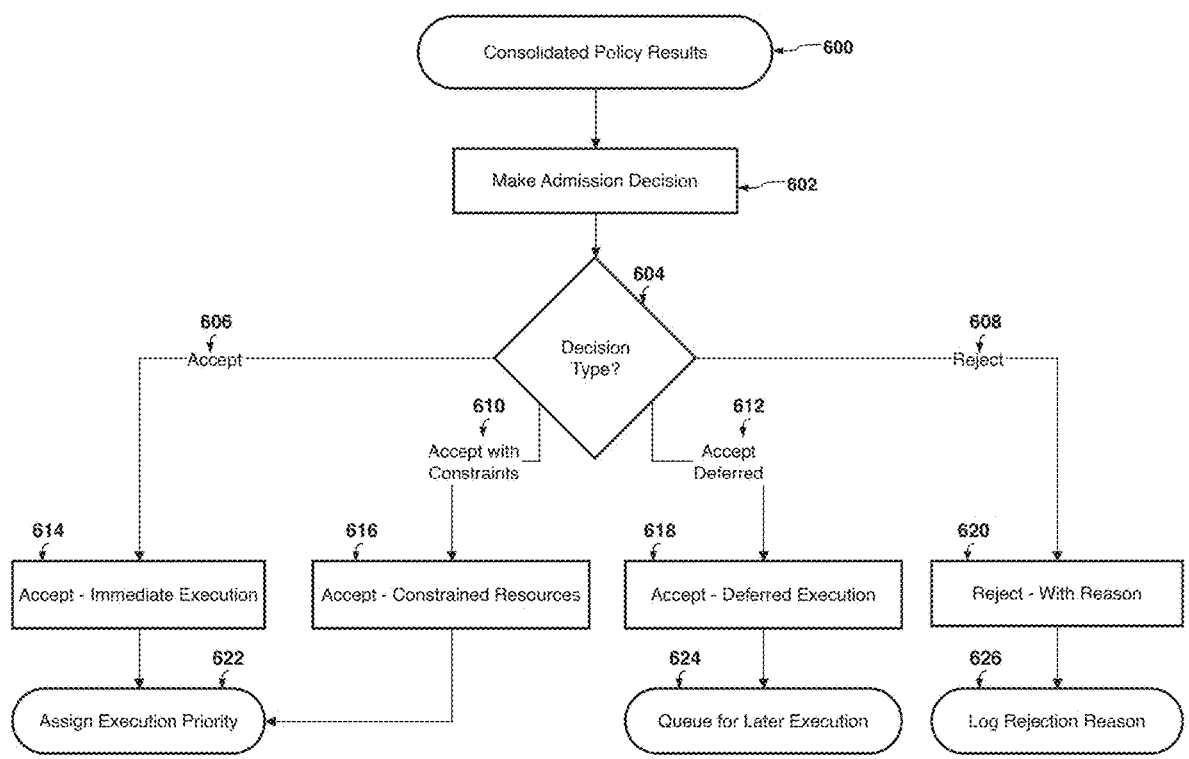
FIG. 6 is a flow diagram illustrating a method of operation of the Decision Maker component of the Admission Control Engine within the RequestID System, according to an embodiment of the present invention.

Referring now to FIG. 6, a flow diagram illustrating a method of operation of the Decision Maker component of the Admission Control Engine within the RequestID System, is described in more detail. The Decision Maker component implements a decision making process that begins with Consolidated Policy Results entering the component at step 600. These results represent the outcome of policy evaluations performed by the Policy Engine component, incorporating security, resource, business priority, and compliance considerations.

At the next step 602, the system performs an Admission Decision operation, wherein the system integrates all preceding analysis to determine the request's disposition. This integration considers the risk score from validation, policy evaluation results, resource availability assessment, and current system status to formulate a deterministic decision based on predefined thresholds and rules.

At the next step 604, the system determines the decision type for requests, being one of: Accept 606, Accept with Constraints 610, Accept Deferred 612, or Reject 608. This multi-path branching represents the system's capability to implement graduated responses rather than binary accept/reject decisions. For accepted requests 606, the flow proceeds to Accept—Immediate Execution at step 614, indicating the request is approved without restrictions. This approval grants full access to requested resources with standard execution parameters. For requests accepted with constraints 610, the flow proceeds to Accept—Constrained Resources at step 616, indicating the request is approved but with limited resources. This conditional approval restricts the request's resource consumption while still allowing execution. Both the immediate execution and constrained resources paths converge at the Assign Execution Priority operation at step 622, wherein the system determines the relative importance of the request for subsequent resource scheduling. This assignment ensures appropriate prioritization during execution based on business value and resource availability.

For requests which are accepted for deferred execution 612, the flow proceeds to Accept—Deferred Execution step 618, indicating the request is approved but execution is delayed. This deferred approval then advances to Queue for Later Execution step 624, wherein the request is placed in a priority queue to await resource availability.

For requests which are rejected 608, the flow proceeds to Reject—With Reason step 620, indicating the request is denied. This rejection then advances to Log Rejection Reason 626, wherein the system records the specific justification for denial, providing an audit trail and potential feedback mechanism.

The various decision paths (606, 608, 610, 612) collectively enable the Decision Maker to implement an admission control strategy that accommodates varying resource conditions and security considerations while maintaining alignment with business priorities.

Figure 7:
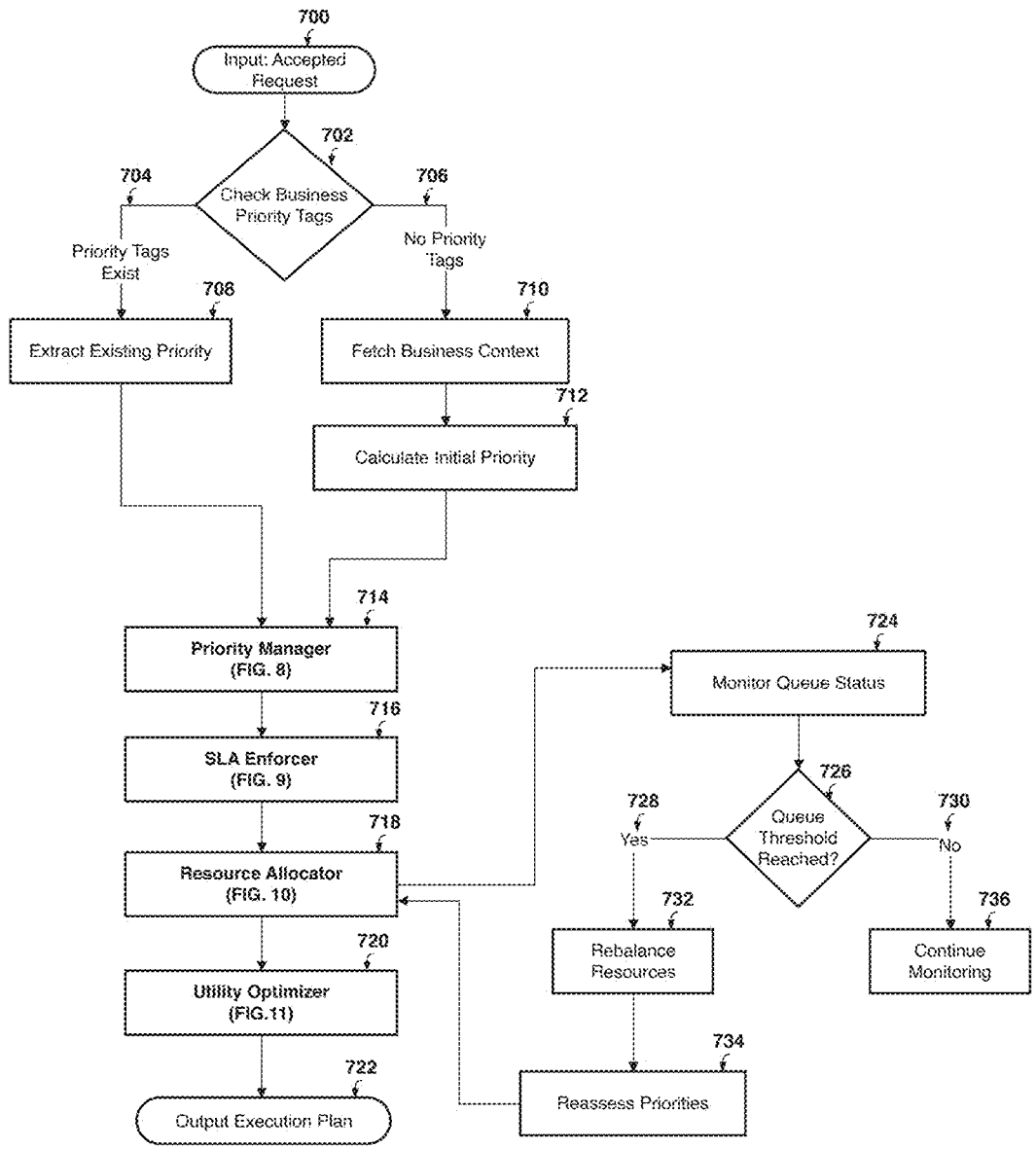
FIG. 7 is a flow diagram illustrating a method of operation of the Resource Scheduler subsystem within the RequestID System, according to an embodiment of the present invention.

Referring now to FIG. 7, a flow diagram illustrating a method of operation of the Resource Scheduler subsystem within the RequestID System, is described in more detail. The Resource Scheduler implements a resource management process that begins with the Accepted Request entering the component at step 700. This input represents a request that has been approved for execution by the Admission Control Engine, either for immediate execution or with resource constraints.

At the next step 702, the system checks Business Priority Tags, wherein the system determines if the request contains pre-assigned priority information. If Business Priority Tags Exist at step 704, the flow proceeds to Extract Existing Priority at step 708, wherein the system retrieves the priority level, category, special handling flags, and other priority indicators embedded within the request. This extraction preserves priority decisions made during earlier processing stages. Whereas, if No Priority Tags exist at step 706, the flow proceeds to Fetch Business Context at step 710, wherein the system retrieves relevant business information associated with the request. This retrieval gathers data regarding the user's tier or importance, the business function being performed, transaction value, and organizational priorities. Following context retrieval, the system advances to Calculate Initial Priority at step 712, wherein it applies business rules to determine an appropriate base priority level for the request.

Both the priority tag extraction and initial priority calculation paths converge at the Priority Manager processing stage at step 714, which refines and finalizes request priorities based on multiple factors including user tier, function criticality, temporal considerations, and system load conditions.

At the next step 716, the system checks the SLA levels within the SLA Enforcer. This ensures that service level agreements are maintained for significant and/or critical operations by evaluating completion probability and adjusting execution parameters accordingly.

At the next step 718, the Resource Allocator is used to manage the assignment of computing resources to the request based on availability, request priority, and resource constraints. This allocation determines whether the request receives full resources, constrained resources, or deferred execution.

At the next step 720, the system uses the Utility Optimizer to maximize the business value derived from allocated resources through execution optimization, batch processing, timeout configuration, and other efficiency improvements.

In addition to this sequential processing, the system also implements a continuous monitoring and feedback loop beginning with monitoring Queue Status at step 724. This monitoring examines queue length, wait times, priority distribution, and resource availability to identify potential bottlenecks or inefficiencies.

The monitoring flow feeds into a Queue Threshold Reached decision point 726 that determines whether intervention is recommended and/or required based on queue metrics. If thresholds are exceeded 728, the flow proceeds to Rebalance Resources at step 732, wherein resource allocations are adjusted to address queue buildup. This rebalancing leads to Reassess Priorities at step 734, wherein queue positions are recalculated based on changing conditions. If thresholds are not exceeded 730, the flow proceeds to Continue Monitoring 736, maintaining vigilance without intervention.

The Resource Scheduler process concludes with the production of an Output Execution Plan 722 that encapsulates all resource allocation decisions, execution parameters, and optimization settings. This plan guides the actual execution of the request by backend services and represents the culmination of the resource management process. This resource scheduling approach illustrated herein enables the RequestID System to optimize resource utilization according to business priorities while maintaining service levels for significant and/or critical operations and adapting to changing system conditions.

Figure 8:
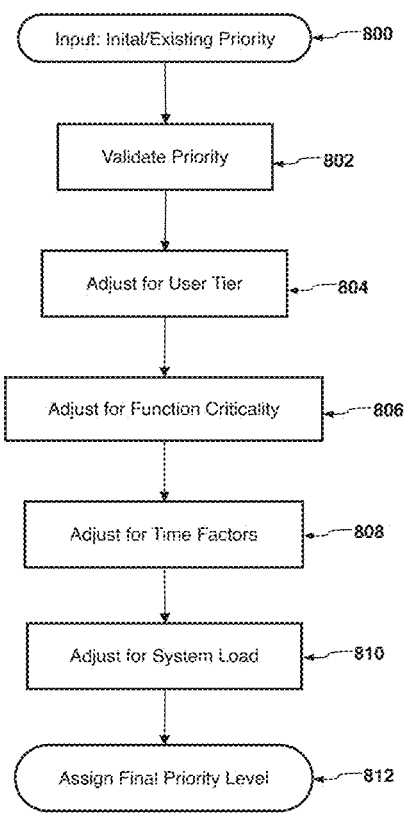
FIG. 8 is a flow diagram illustrating a method of operation of the Priority Manager component within the Resource Scheduler subsystem of the RequestID System, according to an embodiment of the present invention.

Referring now to FIG. 8, a flow diagram illustrating a method of operation of the Priority Manager component within the Resource Scheduler subsystem of the RequestID System, is described in more detail. The Priority Manager implements a multi-stage priority refinement process that begins Initial/Existing Priority entering the component at step 800. This input represents either a newly calculated priority based on business context or a previously assigned priority extracted from request metadata.

At the next step 802, the system validates priority, wherein the system confirms the consistency and legitimacy of the priority assignment. This validation ensures the priority level falls within allowed ranges, verifies that the requesting entity is authorized for the assigned priority level, confirms that the function warrants the assigned priority, and validates any special priority flags or markers. This validation step prevents priority manipulation and ensures equitable handling of requests according to organizational policies.

At the next step 804, the system adjusts priority for User Tier, wherein the system modifies the priority based on the requester's classification within the system. This adjustment provides priority enhancements for premium users, implements appropriate priority adjustments for SLA-covered customers, assigns elevated priority to mission-significant and/or mission-critical accounts, and establishes baseline priorities for standard users.

At the next step 806, the system adjusts priority for Function Criticality, where the system further refines priority based on the operational importance of the requested function. This adjustment assigns higher priority to core business operations, provides priority boosts to revenue-generating functions, maintains baseline priority for infrastructure and security functions, and assigns standard or lower priority to non-essential operations.

At the next step 808, the system adjusts priority for Time Factors, wherein the system incorporates temporal considerations into the priority determination. This temporal adjustment accounts for time of day effects (such as business hours versus off-hours), day of week impacts, seasonal factors, proximity to deadlines, and business cycle position.

At the next step 810, the system adjusts priority for System Load, wherein the system considers current operational conditions when finalizing priority. This load-based adjustment elevates critical function priorities during high system load, implements stricter priority enforcement during resource constraints, applies standard priority rules during normal operations, and may relax priority distinctions during periods of resource abundance.

The Priority Manager process concludes at step 812 with the assignment of a Final Priority Level. At this step, the system applies a comprehensive priority algorithm to determine the final priority designation. This assignment includes a numerical priority level (typically on a defined scale), categorization (such as critical, high, medium, or low), special handling flags for exceptional cases, and priority justification metadata.

This priority management approach illustrated herein enables the RequestID System to implement business-aligned resource allocation that considers multiple contextual factors while maintaining adaptability to changing conditions.

Figure 9:
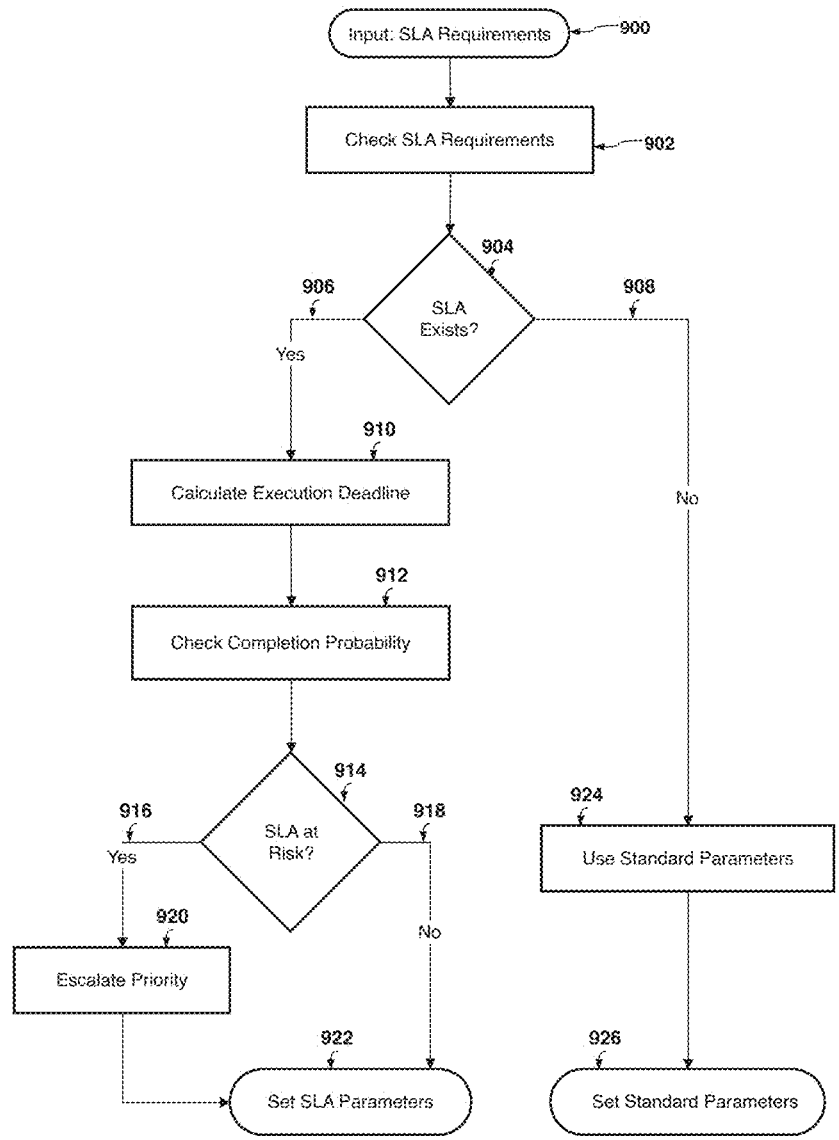
FIG. 9 is a flow diagram illustrating a method of operation of the SLA Enforcer component within the Resource Scheduler subsystem of the RequestID System, according to an embodiment of the present invention.

Referring now to FIG. 9, a flow diagram illustrating a method of operation of the SLA Enforcer component within the Resource Scheduler subsystem of the RequestID System, is described in more detail. The SLA Enforcer implements a service level agreement management process that begins with SLA Requirements entering the component at step 900. This input represents the service level parameters and commitments associated with the request being processed.

At the next step 902, the system checks SLA Requirements, wherein the system examines whether formal service level agreements apply to the current request. At this step the system queries the SLA database for the user and function, identifies any performance guarantees specified in contracts, determines response time commitments, and notes availability requirements.

At the next step 904, the system checks whether a formal SLAs exist for the current request. If a formal SLA Exists at step 906, the flow proceeds to Calculate Execution Deadline at step 910, wherein the system determines the latest allowable completion time for the request. This calculation factors in the request arrival time and SLA terms, considers current system performance metrics, and accounts for the expected processing duration of the request.

At the next step 912, the system checks Completion Probability, wherein the system evaluates the likelihood of meeting the calculated deadline. This evaluation analyzes current system load conditions, considers historical performance data for similar requests, factors in the complexity of the current request, and assesses resource availability.

At the next step 914, the system determines if SLA is at Risk and whether an intervention is required. This decision evaluates whether the calculated probability falls below acceptable thresholds, indicating potential SLA breach. If SLA is at Risk at step 916, the system escalates Priority to improve SLA compliance probability. At this step the system may adopt measures like temporarily increasing request priority, adjusting resource allocation parameters, optimizing the execution path, and intensifying monitoring frequency.

Both the escalation path 916 and the non-risk path 918 converge at Set SLA Parameters step 922, wherein the system establishes execution parameters specific to SLA requirements. These parameters define maximum processing time limits, establish resource allocation minimums, determine appropriate monitoring frequency, and configure alert thresholds.

If no initial SLA exists at step 908, the system proceeds to use Standard Parameters at step 924, wherein the system applies default execution parameters in the absence of formal SLA requirements. The system then advances to Set Standard Parameters at step 926, wherein standard resource allocations, monitoring rules, and timeout values are configured.

Both the SLA-specific and standard parameter paths produce configuration settings that direct subsequent processing by the Resource Allocator and other downstream components, ensuring that execution proceeds according to appropriate service level expectations. This SLA enforcement mechanism illustrated herein enables the RequestID System to maintain performance guarantees for critical operations while appropriately prioritizing resources according to service-level agreements.

Figure 10:
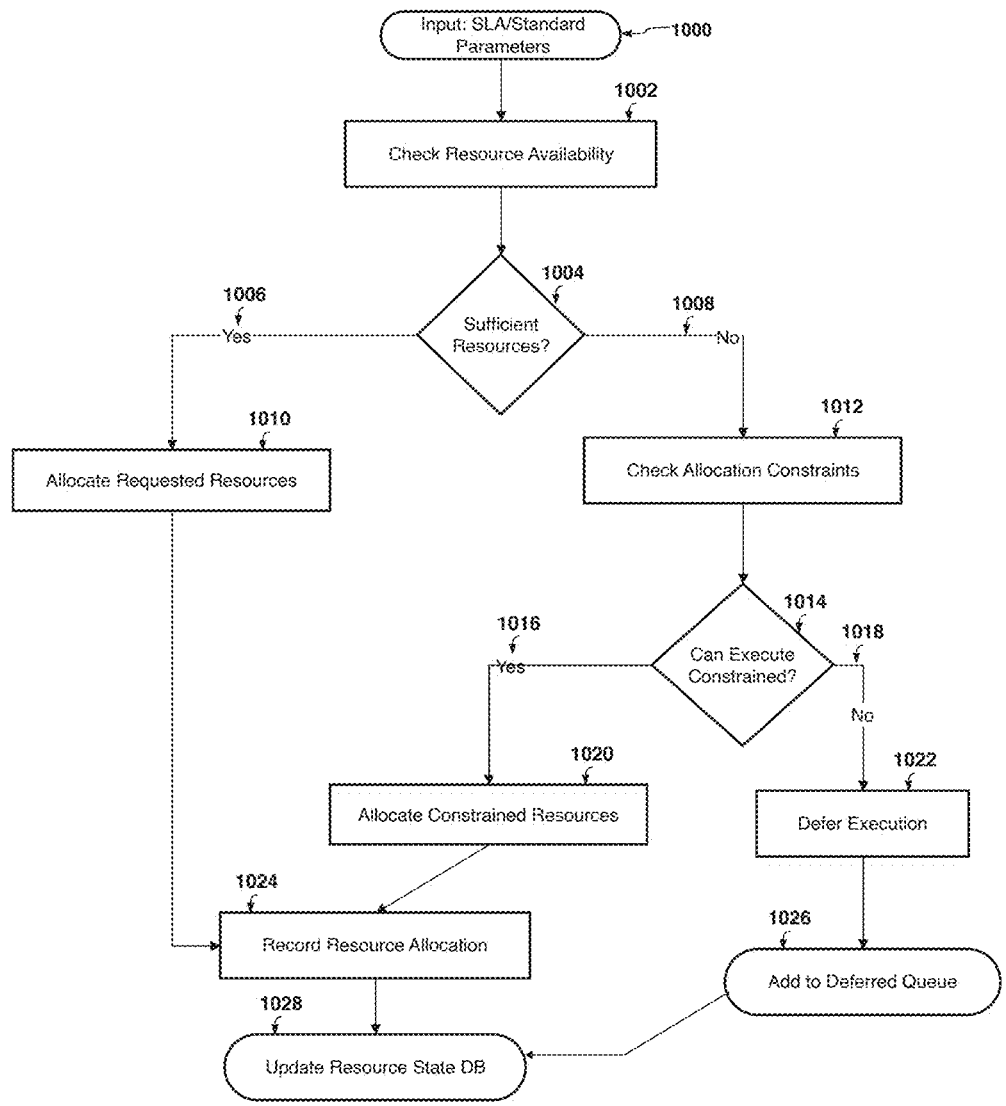
FIG. 10 is a flow diagram illustrating a method of operation of the Resource Allocator component within the Resource Scheduler subsystem of the RequestID System, according to an embodiment of the present invention.

Referring now to FIG. 10, a flow diagram illustrating a method of operation of the Resource Allocator component within the Resource Scheduler subsystem of the RequestID System, is described in more detail. The Resource Allocator implements a resource management process that begins SLA/Normal Parameters entering the component at step 1000. This input represents the execution parameters established by the SLA Enforcer, indicating either specialized service level requirements or standard execution parameters.

At the next step 1002, the system checks Resource Availability, wherein the system examines the current state of computing resources within the serverless environment. At this step the system queries available computing capacity, verifies memory resources, assesses network bandwidth, and checks storage capacity. This evaluation provides a snapshot of resource availability to inform subsequent allocation decisions.

At the next step 1004, the system checks to determine if sufficient resources are currently available. At this step the system compares the requirements specified in the input parameters against the available computing resources/capacity, considers competing requests and existing reservations, and projects near-term availability changes.

If sufficient resources are available 1006, the system allocates Requested Resources at step 1010. At this step the system assigns the requested computing resources to the request. This allocation creates reservations in the resource management system, prepares function instances for execution, and configures the execution environment according to specified parameters. If sufficient resources are not available 1008, the system checks Allocation Constraints at step 1012, wherein the system evaluates whether execution with reduced resources remains viable. This evaluation determines minimum resource requirements for function execution, verifies that the function can execute effectively with reduced resources, assesses potential performance impacts of constrained execution, and identifies alternative execution options.

At the next step 1014, the system determines whether constrained execution is feasible. This decision evaluates the business impact of constraints, considers service level agreement implications, and assesses user experience impacts.

If constrained execution is feasible at step 1016, the system allocates Constrained Resources at step 1020. At this step the system assigns reduced computing resources sufficient for minimal viable execution. This approach allows execution to proceed despite resource constraints, maintaining system throughput while acknowledging performance compromises. If constrained execution is not feasible at step 1018, the system, defers the execution at step 1022. At this step the system prepares the request for delayed processing when resources become available. This deferral path then advances to Add to Deferred Queue at step 1026, wherein the request is placed in an appropriate priority queue with position determined by business priority and arrival time.

All three allocation paths (full allocation, constrained allocation, and deferred execution) converge at Record Resource Allocation step 1024, wherein the system documents the allocation decision and its justification. At this step the system captures the resource assignments, records allocation reasoning, preserves priority information, and timestamps the decision.

The process concludes at step 1028 where the system updates Resource State DB. At this step the resource management system is updated to reflect the allocation decision. This update decrements available capacity, finalizes resource reservations, revises resource projections, and records usage metrics. This database update maintains accurate resource state information critical for subsequent allocation decisions. The resource allocation approach illustrated herein enables the RequestID System to optimize resource utilization while maintaining appropriate service levels for requests according to their business importance and contractual requirements.

Figure 11:
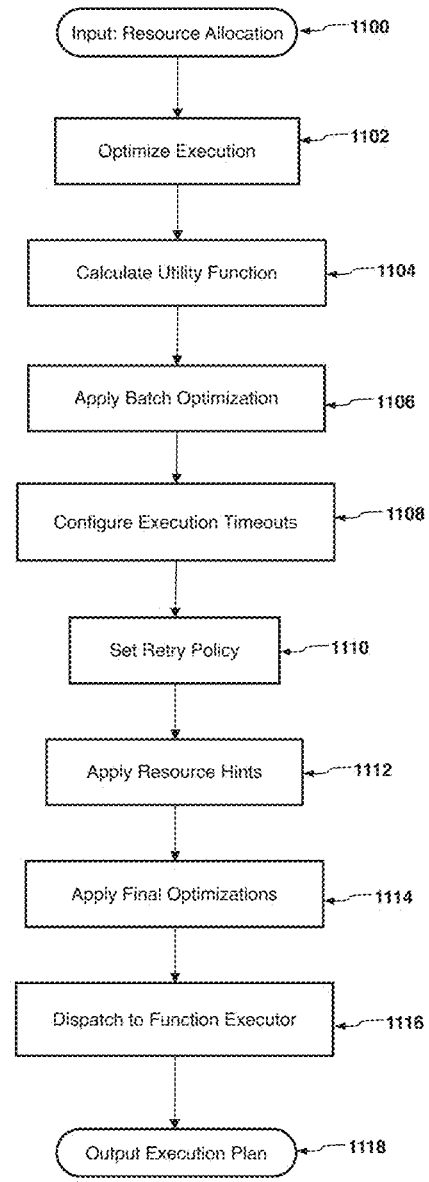
FIG. 11 is a flow diagram illustrating a method of operation of the Utility Optimizer component within the Resource Scheduler subsystem of the RequestID System, according to an embodiment of the present invention.

Referring now to FIG. 11, a flow diagram illustrating a method of operation of the Utility Optimizer component within the Resource Scheduler subsystem of the RequestID System, is described in more detail. The Utility Optimizer implements an execution enhancement process that begins with Resource Allocation entering the component at step 1100. This input represents the resource assignment decisions made by the Resource Allocator, specifying the computing resources allocated to the request.

At the next step 1102, the system optimizes execution, wherein the system fine-tunes the execution configuration to maximize efficiency within allocated resources. This optimization adjusts function configuration parameters, refines execution settings, calibrates performance parameters, and balances resource utilization across components.

At the next step 1104, the system calculates a Utility Function, wherein the system applies business value metrics to quantify the expected return on resource investment. This calculation determines value per resource unit, computes priority-to-resource ratios, performs cost-benefit analysis, and estimates business impact per execution unit.

At the next step 1106, the system applies Batch Optimization, wherein the system identifies opportunities to process similar requests as cohesive groups for improved efficiency. This optimization identifies related requests, consolidates shared resources, sequences processing for maximum throughput, and eliminates duplicate operations.

At the next step 1108, the system configures Execution Timeouts, wherein the system establishes appropriate temporal constraints for execution. This configuration sets maximum execution time limits, defines idle timeouts to reclaim resources from stalled processes, establishes connection timeouts for external dependencies, and configures internal operation timeouts for component functions.

At the next step 1110, the system sets Retry Policy, wherein the system configures failure handling mechanisms for the request. This configuration specifies retry attempt quantities, defines backoff strategies between retries, establishes failure thresholds for abandonment, and determines recovery procedures for different error scenarios.

At the next step 1112, the system applies Resource Hints, wherein the system provides execution environment guidance to optimize resource utilization. These hints specify memory usage patterns, indicate CPU utilization expectations, define I/O characteristics, and outline network usage patterns. These execution hints enable the underlying infrastructure to optimize the execution environment for the specific workload characteristics of the request.

At the next step 1114, the system applies Final Optimizations, wherein the system makes last-minute adjustments based on current conditions. This finalization rechecks system state, accommodates any late-arriving high-priority requests, performs final resource allocation tuning, and establishes the definitive execution sequence.

The Utility Optimizer process terminates with Dispatch to Function Executor at step 1116. At this step the fully optimized request is transmitted to the execution environment. The Utility Optimizer component produces an Output Execution Plan at step 1118 that encapsulates all optimization decisions, execution parameters, and monitoring configurations. The utility optimization process illustrated herein enables the RequestID System to maximize the business value derived from computing resources while ensuring reliable execution and efficient resource utilization.

It is contemplated and included within the scope of the invention that the various systems and methods may be implemented on computer hardware, such as a server. Such a server may be operated locally or in a cloud environment. The server may include computer components as is typical in such use cases, included, but not limited to, processing components, data storage components, memory, network communication devices, peripheral connection devices, and the like. Processing components may include any processor or microprocessor as is known in the art, include field programmable gate arrays, integrated circuits, and the like. Data storage components may include any non-transitory computer-readable storage media as are known in the art, including, but not limited to, solid state devices, hard disk drives, flash memory, optical storage drives, magnetic tape storage drives, and the like. Additionally, network communication devices may be employed, including network communication devices operable to communicate across a network, wired or wirelessly, as is known in the art, including Ethernet devices, IEEE 802.XX devices such as Wi-Fi devise, Bluetooth devices, Zigbee devices, Z-Wave devices, Matter/Thread devices, and cellular network communication devices, such that communication across Personal Area Networks, Local Area Networks, and/or Wide Area Networks, such as the Internet, is enabled. Moreover, peripheral communication devices operable to enable communication with peripheral devices may be included, such as Universal Serial Bus devices.

Some of the illustrative aspects of the present invention may be advantageous in solving the problems herein described and other problems not discussed which are discoverable by a skilled artisan.

While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

Thus the scope of the invention should be determined by the appended claims and their legal equivalents, and not by the examples given.

What is claimed is:

1. A method for request identification in serverless functions comprising:
   receiving an incoming request from a requesting user;
   comparing the incoming request to a cache of received requests;
   one of rejecting the incoming request and transmitting the incoming request to a resource scheduling module based on a cached decision responsive to determining the incoming request is comprised by the cache of received requests; and
   responsive to determining the incoming request is not comprised by the cache of received requests:
      extracting request data from the incoming request;
      performing a request validation analysis on the request data;
      rejecting the incoming request responsive to a failing result from the request validation analysis;
      responsive to a passing result from the request validation analysis:
         retrieving contextual information associated with the requesting user;
         generating a unique user identification associated with the incoming request via a UUID generator module;
         performing a request validation analysis on the incoming request via a request validator module;
         applying one or more policies to the incoming request responsive to receiving a result from the request validator module indicating the incoming request is validated;
         generating a request determination for the incoming request via a decision-making module;
         updating a decision cache responsive based on the request determination;
         transmitting the incoming request to the resource scheduling module responsive to the request determination indicating acceptance of the incoming request; and
         rejecting the incoming request responsive to the request determination indicating rejection of the incoming request.

2. The method of claim 1 wherein comparing the incoming request to a cache of received requests comprises defining a cached request that matches the incoming request, the method further comprising:
   evaluating a cached decision associated with the cached request to identify the cached decision as pre-approved or malicious;
   rejecting the incoming request responsive to identifying the cached decision as malicious;
   applying a rate limiting function to the incoming request responsive to identifying the decision as pre-approved;
   rejecting the incoming request responsive to the rate limiting function returning a result of a rate limit threshold being exceeded; and
   transmitting the incoming request to the resource scheduling module responsive to the rate limiting function returning a result of the rate limit threshold not being exceeded.

3. The method of claim 1 wherein the UUID generator module is operable to generate a unique user identification by:
   generating a unique identifier;
   extracting at least one contextual element from the incoming request;
   integrating a plurality of authentication-related elements into a combined authentication factor element;
   applying a hashing algorithm to the combined authentication factor element, generating a hashed authentication value; and
   combining the hashed authentical with the unique identifier into a single file, producing the unique user identification.

4. The method of claim 3 wherein the at least one contextual element comprises at least one of:
   user identity information;
   an incoming request timestamp;
   target resource information requested by the incoming request;
   an IP address of the requesting user;
   a geographic location of the requesting user;
   a request type associated with the incoming request; or
   an anticipated resource consumption associated with the incoming request.

5. The method of claim 3 wherein the plurality of authentication-related elements comprises at least two authentication-related elements selected from the group consisting of:
   user credentials associated with the requesting user;
   session information associated with at least one of the requesting user and the incoming request;
   temporal factors relative to at least one established pattern associated with the requesting user;
   spatial factors related to at least one of a geographic origin and one or more network characteristics of the incoming request; and
   behavioral factors reflecting typical usage patterns associated with the requesting user.

6. The method of claim 1 wherein the request validator module is operable to perform the request validation analysis by:
   performing a request validation operation;
   performing an authentication check operation on the requesting user;
   comparing the incoming request to a collection of established pattern records associated with the requesting user;
   performing an anomaly detection analysis on the comparison of the incoming request to the collection of established pattern records;
   calculating a risk score based on the request validation operation, the authentication check, the comparing the incoming request to the collection of established pattern records, and the anomaly detection analysis; and
   generating a request context file based on the risk score, the authentication check, the comparing the incoming request to the collection of established pattern records, and the anomaly detection analysis.

7. The method of claim 1 a policy engine is operable to apply the one or more policies to the incoming request by:
   identifying and retrieving a plurality of policies relevant to the incoming request, producing a plurality of retrieved policies; and
   applying the plurality of retrieved policies to the incoming request.

8. The method of claim 7 wherein applying the plurality of retrieved policies to the incoming request comprises:
- applying at least one security policy comprised by the plurality of retrieved policies to the incoming request;
- applying at least one rate limiting policy comprised by the plurality of retrieved policies to the incoming request;
- applying at least one business priority policy comprised by the plurality of retrieved policies to the incoming request;
- applying at least one resource allocation policy comprised by the plurality of retrieved policies to the incoming request;
- applying at least one cost control policy comprised by the plurality of retrieved policies to the incoming request; and
- applying at least one compliance policy comprised by the plurality of retrieved policies to the incoming request.

9. The method of claim 1 wherein the decision-making module is operable to generate the request determination by:
- performing an admission decision operation, resulting in a decision type associated with the incoming request;
- generating the request determination as a rejection responsive to the output of the admission decision operation being a rejection;
- responsive to the output of the admission decision being a deferred acceptance decision type:
  - generating the request determination as an acceptance with deferred execution; and
  - queueing the incoming request for subsequent delayed execution;
- responsive to the output of the admission decision being a constrained resources acceptance decision type, generating the request determination as an acceptance with priority execution with a limitation on computing resources to be committed to execution of the incoming request; and
- responsive to the output of the admission decision being an acceptance decision type, generating the request determination as an acceptance with priority execution.

10. The method of claim 1 wherein the resource scheduling module is operable to implement a resource management process comprising:
- receiving the incoming request once it has been approved, defining an approved incoming request;
- checking the approved incoming request for pre-assigned priority information;
- extracting pre-assigned priority information responsive to determining the approved incoming requests comprises pre-assigned priority information;
- retrieving business information associated with the incoming request and calculating a calculated initial priority based on the business information responsive to determining the approved incoming requests does not comprise pre-assigned priority information;
- finalizing a finalized request priority based on at least one of the pre-assigned priority information and the calculated initial priority;
- performing a service level agreement (SLA) compliance check based on the finalized request priority;
- allocating computer resources for execution of the approved incoming request based on the finalized request priority and the outcome of the SLA compliance check;
- operating a utility optimizer module to produce one or more optimization settings configured to increase a business value derived from the allocated computer resources; and
- producing an output execution plan based on the allocated computer resources and the one or more optimization settings.

11. The method of claim 10 further comprising performing a continuous monitoring and feedback process comprising:
- monitoring a queue status associated with the computer resources from which the allocated computer resources were sourced;
- determining a queue threshold status;
- continue monitoring the queue status responsive to determining the queue threshold status is not exceeded; and
- responsive to determining the queue threshold status is exceeded:
  - performing a computer resource rebalancing process; and
  - recalculating queue positions based on the computer resource rebalancing process.

12. The method of claim 10 wherein finalizing the finalized request priority comprises:
- validating a priority assignment, being at least one of the pre-assigned priority information and the calculated initial priority;
- adjusting the priority assignment based on a user tier associated with the requesting user;
- determining an operational importance of the incoming request and adjusting the priority assignment based on the operational importance;
- determining at least one temporal factor associated with the incoming request and adjusting the priority assignment based on the temporal factor;
- determining current operational conditions for the computing resources to be allocated to the approved incoming request and adjusting the priority assignment based on the current operational conditions; and
- assigning a finalized priority level to the priority assignment, defining the finalized request priority.

13. The method of claim 12 wherein performing the SLA compliance check comprises:
- determining whether one or more service level agreements associated with the incoming request;
- responsive to determining one or more service level agreements associated the incoming request exists, defining a relevant SLA:
  - calculating a latest allowable completion time associated with the incoming requests based on the SLA;
  - determining a completion probability reflecting a likelihood of completing execution of the incoming request by the latest allowable completion time;
  - responsive to determining the completion probability exceeds a completion probability threshold, increasing the finalized priority level of the finalized request priority; and
  - setting request parameters of the incoming request based on the relevant SLA; and
- responsive to determining no service level agreements associated with the incoming request exist, setting the request parameters of the incoming request based on one or more standard parameters.

14. The method of claim 13 wherein allocating computer resources for execution of the approved incoming request comprises:
- receiving the finalized request priority comprising the request parameters;
- determining a current computer resource availability;
- comparing the current computer resource availability to the request parameters;

allocating computer resources according to the request parameters responsive to the comparison the current computer resource availability step determining the current computer resource availability exceeds the request parameters;

responsive to determining the request parameters exceed the current computer resource availability:
  determining if executing the incoming request with computing resources less than indicated by the request parameters is viable;
  deferring execution of the incoming request by adding the incoming request to a deferred queue responsive to determining executing the incoming request with computing resources less than indicated by the request parameters is not viable; and
  allocating constrained computing resources that are less than the computer resources indicated by the request parameters responsive to determining executing the incoming request with computing resources less than indicated by the request parameters is viable;

generating a resource allocation decision based on at least one of the allocating computer resources, the allocating constrained computing resources, and the deferring execution; and updating a computer resource state database responsive to resource allocation decision.

15. The method of claim 14 wherein operating the utility optimizer module to produce one or more optimization settings comprises:
  receiving the resource allocation decision;
  generating an execution configuration based on at least one of the incoming request, the finalized request priority, and the resource allocation decision;
  performing an execution optimization on the execution configuration;
  calculating an utility function to assign a business value to execution of the incoming request and adding the output of the utility function to the execution configuration;
  performing batch optimization on the execution configuration;
  defining a temporal constraint for the execution configuration;
  defining a retry policy for the execution configuration; and
  applying one or more final optimizations to the execution configuration; and
  outputting the execution configuration as the execution plan.

16. A system for request identification in serverless functions comprising:
  a processor;
  a network communication device positioned in communication with the processor; and
  a non-transitory computer-readable medium positioned in communication with the processor and having software stored thereon that, when executed by the processor, is operable to:
    receive an incoming request from a requesting user;
    compare the incoming request to a cache of received requests;
    one of reject the incoming request and transmit the incoming request to a resource scheduling module based on a cached decision responsive to determining the incoming request is comprised by the cache of received requests; and
    responsive to determining the incoming request is not comprised by the cache of received requests:
      extract request data from the incoming request;
      perform a request validation analysis on the request data;
      reject the incoming request responsive to a failing result from the request validation analysis;
      responsive to a passing result from the request validation analysis:
        retrieve contextual information associated with the requesting user;
        operate a UUID generator module to generate a unique user identification associated with the incoming request;
        operate a request validator module to perform a request validation analysis on the incoming request;
        apply one or more policies to the incoming request responsive to receiving a result from the request validator module indicating the incoming request is validated;
        operate a decision-making module to generate a request determination for the incoming request;
        update a decision cache responsive based on the request determination;
        transmit the incoming request to the resource scheduling module responsive to the request determination indicating acceptance of the incoming request; and
        reject the incoming request responsive to the request determination indicating rejection of the incoming request.

17. The system of claim 16 wherein the software is further operable to, when executed by the processor, compare the incoming request to a cache of received requests by defining a cached request that matches the incoming request by:
  evaluating a cached decision associated with the cached request to identify the cached decision as pre-approved or malicious;
  rejecting the incoming request responsive to identifying the cached decision as malicious;
  applying a rate limiting function to the incoming request responsive to identifying the decision as pre-approved;
  rejecting the incoming request responsive to the rate limiting function returning a result of a rate limit threshold being exceeded; and
  transmitting the incoming request to the resource scheduling module responsive to the rate limiting function returning a result of the rate limit threshold not being exceeded.

18. The system of claim 16 wherein the UUID generator module is operable to generate a unique user identification by:
  generating a unique identifier;
  extracting at least one contextual element from the incoming request;
  integrating a plurality of authentication-related elements into a combined authentication factor element;
  applying a hashing algorithm to the combined authentication factor element, generating a hashed authentication value; and
  combining the hashed authentical with the unique identifier into a single file, producing the unique user identification.

19. The system of claim 18 wherein the at least one contextual element comprises at least one of:
   user identity information;
   an incoming request timestamp;
   target resource information requested by the incoming request;
   an IP address of the requesting user;
   a geographic location of the requesting user;
   a request type associated with the incoming request; or
   an anticipated resource consumption associated with the incoming request.

20. The system of claim 18 wherein the plurality of authentication-related elements comprises at least two authentication-related elements selected from the group consisting of:
   user credentials associated with the requesting user;
   session information associated with at least one of the requesting user and the incoming request;
   temporal factors relative to at least one established pattern associated with the requesting user;
   spatial factors related to at least one of a geographic origin and one or more network characteristics of the incoming request; and
   behavioral factors reflecting typical usage patterns associated with the requesting user.

21. The system of claim 16 wherein the request validator module is operable to perform the request validation analysis by:
   performing a request validation operation;
   performing an authentication check operation on the requesting user;
   comparing the incoming request to a collection of established pattern records associated with the requesting user;
   performing an anomaly detection analysis on the comparison of the incoming request to the collection of established pattern records;
   calculating a risk score based on the request validation operation, the authentication check, the comparing the incoming request to the collection of established pattern records, and the anomaly detection analysis; and
   generating a request context file based on the risk score, the authentication check, the comparing the incoming request to the collection of established pattern records, and the anomaly detection analysis.

22. The system of claim 16 wherein the software is operable to, when executed by the processor, operate a policy engine operable to apply the one or more policies to the incoming request by:
   identifying and retrieving a plurality of policies relevant to the incoming request, producing a plurality of retrieved policies; and
   applying the plurality of retrieved policies to the incoming request.

23. The system of claim 22 wherein the policy engine is operable to apply the plurality of retrieved policies to the incoming request by:
   applying at least one security policy comprised by the plurality of retrieved policies to the incoming request;
   applying at least one rate limiting policy comprised by the plurality of retrieved policies to the incoming request;
   applying at least one business priority policy comprised by the plurality of retrieved policies to the incoming request;
   applying at least one resource allocation policy comprised by the plurality of retrieved policies to the incoming request;
   applying at least one cost control policy comprised by the plurality of retrieved policies to the incoming request; and
   applying at least one compliance policy comprised by the plurality of retrieved policies to the incoming request.

24. The system of claim 16 wherein the decision-making module is operable to generate the request determination by:
   performing an admission decision operation, resulting in a decision type associated with the incoming request;
   generating the request determination as a rejection responsive to the output of the admission decision operation being a rejection;
   responsive to the output of the admission decision being a deferred acceptance decision type:
      generating the request determination as an acceptance with deferred execution; and
      queueing the incoming request for subsequent delayed execution;
   responsive to the output of the admission decision being a constrained resources acceptance decision type, generating the request determination as an acceptance with priority execution with a limitation on computing resources to be committed to execution of the incoming request; and
   responsive to the output of the admission decision being an acceptance decision type, generating the request determination as an acceptance with priority execution.

25. The system of claim 16 wherein the resource scheduling module is operable to implement a resource management process comprising:
   receiving the incoming request once it has been approved, defining an approved incoming request;
   checking the approved incoming request for pre-assigned priority information;
   extracting pre-assigned priority information responsive to determining the approved incoming requests comprises pre-assigned priority information;
   retrieving business information associated with the incoming request and calculating a calculated initial priority based on the business information responsive to determining the approved incoming requests does not comprise pre-assigned priority information;
   finalizing a finalized request priority based on at least one of the pre-assigned priority information and the calculated initial priority;
   performing a service level agreement (SLA) compliance check based on the finalized request priority;
   allocating computer resources for execution of the approved incoming request based on the finalized request priority and the outcome of the SLA compliance check;
   operating a utility optimizer module to produce one or more optimization settings configured to increase a business value derived from the allocated computer resources; and
   producing an output execution plan based on the allocated computer resources and the one or more optimization settings.

26. The system of claim 25 wherein the software is further operable to, when executed by the software:
   monitor a queue status associated with the computer resources from which the allocated computer resources were sourced;
   determine a queue threshold status;
   continue monitoring the queue status responsive to determining the queue threshold status is not exceeded; and responsive to determining the queue threshold status is exceeded:
  perform a computer resource rebalancing process; and
  recalculate queue positions based on the computer resource rebalancing process.

27. The system of claim 25 wherein the software is operable to, when executed by the processor, finalize the finalized request priority by:
  validating a priority assignment, being at least one of the pre-assigned priority information and the calculated initial priority;
  adjusting the priority assignment based on a user tier associated with the requesting user;
  determining an operational importance of the incoming request and adjusting the priority assignment based on the operational importance;
  determining at least one temporal factor associated with the incoming request and adjusting the priority assignment based on the temporal factor;
  determining current operational conditions for the computing resources to be allocated to the approved incoming request and adjusting the priority assignment based on the current operational conditions; and
  assigning a finalized priority level to the priority assignment, defining the finalized request priority.

28. The system of claim 27 wherein the software is operable to, when executed by the processor, perform the SLA compliance check by:
  determining whether one or more service level agreements associated with the incoming request;
  responsive to determining one or more service level agreements associated the incoming request exists, defining a relevant SLA:
    calculating a latest allowable completion time associated with the incoming requests based on the SLA;
    determining a completion probability reflecting a likelihood of completing execution of the incoming request by the latest allowable completion time;
    responsive to determining the completion probability exceeds a completion probability threshold, increasing the finalized priority level of the finalized request priority; and
    setting request parameters of the incoming request based on the relevant SLA; and
  responsive to determining no service level agreements associated with the incoming request exist, setting the request parameters of the incoming request based on one or more standard parameters.

29. The system of claim 28 wherein the software is operable to, when executed by the processor, allocate computer resources for execution of the approved incoming request by:
  receiving the finalized request priority comprising the request parameters;
  determining a current computer resource availability;
  comparing the current computer resource availability to the request parameters;
  allocating computer resources according to the request parameters responsive to the comparison the current computer resource availability step determining the current computer resource availability exceeds the request parameters;
  responsive to determining the request parameters exceed the current computer resource availability:
    determining if executing the incoming request with computing resources less than indicated by the request parameters is viable;
    deferring execution of the incoming request by adding the incoming request to a deferred queue responsive to determining executing the incoming request with computing resources less than indicated by the request parameters is not viable; and
    allocating constrained computing resources that are less than the computer resources indicated by the request parameters responsive to determining executing the incoming request with computing resources less than indicated by the request parameters is viable;
  generating a resource allocation decision based on at least one of the allocating computer resources, the allocating constrained computing resources, and the deferring execution; and
  updating a computer resource state database responsive to resource allocation decision.

30. The system of claim 29 wherein the utility optimizer module is operable to produce one or more optimization settings by:
  receiving the resource allocation decision;
  generating an execution configuration based on at least one of the incoming request, the finalized request priority, and the resource allocation decision;
  performing an execution optimization on the execution configuration;
  calculating an utility function to assign a business value to execution of the incoming request and adding the output of the utility function to the execution configuration;
  performing batch optimization on the execution configuration;
  defining a temporal constraint for the execution configuration;
  defining a retry policy for the execution configuration; and
  applying one or more final optimizations to the execution configuration; and
  outputting the execution configuration as the execution plan.

* * * * *